United States Patent [19]
Barkis et al.

[11] 3,871,910
[45] Mar. 18, 1975

[54] EXTRUDED POLYPROPYLENE PRINT BANDS FOR POLYPROPYLENE LENO FABRIC

[75] Inventors: Edward Barkis, Marietta; Ronnie Lee Sirmans, Lakeland, both of Ga.

[73] Assignee: Standard Oil Company, Chicago, Ill.

[22] Filed: Dec. 26, 1972

[21] Appl. No.: 318,529

[52] U.S. Cl.................. 117/138.8 E, 117/161 UH
[51] Int. Cl............................................... B44d 1/09
[58] Field of Search ........ 117/138.8 E, 161 UH, 15, 117/76 T; 260/878 B, 897 R; 161/252

[56] References Cited
UNITED STATES PATENTS

| | | |
|---|---|---|
| 3,268,624 | 8/1966 | Jezl et al............................ 260/878 |
| 3,285,766 | 11/1966 | Barkis et al................. 117/138.8 X |
| 3,318,976 | 5/1967 | Short............................... 260/878 B |
| 3,620,825 | 11/1971 | Lohmann et al............ 117/138.8 E |
| 3,652,725 | 3/1972 | Diaz et al....................... 260/897 X |
| 3,671,383 | 6/1972 | Sakata et al. ....................... 161/252 |
| 3,730,757 | 5/1973 | Knorre......................... 117/138.8 X |
| 3,745,038 | 7/1973 | Jeffs............................. 117/138.8 X |

*Primary Examiner*—P. E. Willis, Jr.
*Attorney, Agent, or Firm*—Robert R. Cochran; Arthur G. Gilkes; William T. McClain

[57] ABSTRACT

A new leno polypropylene fabric having a polypropylene copolymer print band integrally attached is made by extruding a polypropylene copolymer containing a terminal block of ethylene onto a leno polypropylene fabric. Such fabric is useful in making fruit and vegetable bags.

10 Claims, No Drawings

EXTRUDED POLYPROPYLENE PRINT BANDS FOR POLYPROPYLENE LENO FABRIC

BACKGROUND OF THE INVENTION

The field of this invention relates to a new fabric containing a polypropylene copolymer print band, an extrusion process for making such materials, and a bag made from such material. Mesh fabrics which have paper or polyethylene print bands attached by the use of adhesive are commercially available. However, when the open mesh fabric is made of a synthetic material such as polypropylene maintaining good adhesion of the print band to the mesh fabric is difficult. This problem can be readily observed by applying a pulling force oblique to the pattern of the weave in the area of the print band. Under such stress a print band which is adhesively held to a mesh fabric will either tear or peel from the fabric. Either result detracts from maintaining product identification and aesthetic appeal. The subject matter of this invention completely eliminates both problems.

DESCRIPTION OF INVENTION

Most synthetic fiber-forming materials have a non porous and non polar surface which inhibits the ability of another substance to adhere to the synthetic material. This property contributes to the difficulty of affixing a print band or a label to a fabric woven out of such synthetic materials. In addition to the difficulty in adhering a label to plastic fabric materials the problem of retaining the strength of the yarn is apparent if the adhesion process is performed at elevated temperatures such as used in hot melt adhesives or direct extrusion of a film of thermoplastic.

The fabric upon which the print band or label is to be extruded can be made from a variety of yarn forming materials. Primarily they are synthetic materials which can be oriented into yarns. These particular synthetic materials have two basic properties in common. First, they have a non porous and non polar surface thus exhibiting poor adhesion to the print band. Second they are oriented polymeric materials which are susceptible to loss of strength when subjected to the melt temperatures of extruded polypropylene for a definite duration. Since fabrics made from oriented ploypropylene are recognized as being excessively difficult to adhere and since they obviously will loose strength when subjected to a temperature within their melt temperature range the preferred composition for the fabric is polypropylene. However, fiber grade copolymers made by copolymerizing propylene and other monoolefins having up to eight carbon atoms per molecule as well as other fiber grade polyolefins made from combinations of these monoolefins are equivalent materials.

Methods for converting such ploymeric materials into fibers or yarns with extraordinary strength in the axial direction of the yarn are well known in the art. These processes usually involve the application of a strain on the polymeric material while in a plastic state and a subsequent cooling into a yarn. The increased strength is usually attributed to a preferential molecular orientation in the axial direction and increased crystallinity. It is this known phenomenon that allows such materials as polypropylene to be used in making strong fabrics. However, it is further recognized in the art that raising the temperature of such synthetic materials and holding this temperature for a period of time will result in the loss of orientation and crystallinity. This molecular relaxation process thus causes a decrease in mechanical strength of the fabric. In view of this the fabric materials of particular importance to this invention are made from polymeric fibrous yarns which experience the molecular relaxation at or below the melt extrusion temperatures of polypropylene. The preferred embodiment is a fabric made from polypropylene itself. However, other non porous polyolefin fabrics even those with more favorable timetemperature relationships with respect to the molecular relaxation process, are within the contemplated scope of this invention because of the remaining difficulty of adhering an extruded print band.

The particular problems which arise in extruding a print band or label onto the fabrics of this invention are in principle independent of the fabric being of woven or non-woven material as well as independent of the fabric being a tight weave or an open weave. Thus the problems of adhesion and loss of strength are common to the aforementioned types of fabric construction varying only in degree of severity. These types of fabric construction are viewed as being equivalent embodiment of our invention. However, a non-woven fabric, particularly an open non-woven fabric, would require that a substantial number of intersections of the yarns be bonded in order to give structural strength to the fabric. This could be done by any known means such as adhesive coating. This coating is optional for the woven fabric but is preferred. A woven fabric is preferred because of the increased fabric strength associated with weaving. Furthermore, the invention will find its greatest utility in an open weave since a tight weave can sometimes be printed upon directly. However, the tight weave can also be used. The preferred embodiment involves a particular type of fabric construction referred to in the art as a leno weave, which is defined as a weave in which the warp yarns are arranged in pairs so as to twist one around the other between picks of filling yarn as in marquisette.

The open mesh fabrics of the preferred embodiments of this invention are generally characterized as having an essentially regular pattern of holes defined between the yarn strands of the polymeric material. These holes or vacancies will usually represent more than 50 percent of the total surface area of the fabrics. The nominal size of the holes, the size of the holes ignoring the width of the yarn, can vary from approximately an eighth of an inch to a half of an inch and preferrably from a sixth of an inch to a quarter of an inch. Usually, the holes are rectangular and possibly square shaped. However, the geometric shape is not critical and merely reflects the preferred method of weaving the fabric.

Optionally, the open weave fabrics are coated with a vinyl acetate polymer, vinyl acetate copolymer or similar material to reduce yarn slippage and increase fabric stability. The preferred embodiment involving a leno fabric made from polypropylene is coated with a vinyl acetate copolymer. It is critical that this coating not be present on the area of the fabric which is to receive the extruded print band on the fabric.

The polymeric composition of the print band of this invention is limited to a specific class of extrusion grade polypropylene copolymers. The copolymers of this class are characterized as being essentially polymerized propylene with a terminal block of copolymerized ehtylene and propylene. The terminal block of copolymerized ethylene and propylene represents from 1.0 to 6.0 weight per cent and preferrably from 2.0 to 5.0 weight per cent of ethylene calculated on the basis of the weight of ethylene present in the terminal block to the total weight of final copolymer. Such copolymers are further characterized as having a melt flow rate, ASTM D1238-70 condition L, of 1.5 to 10 and preferrably from 4.0 to 6.5 grams of polymer per ten minutes and a minimum density of 0.865. They can be produced by any of the methods known to the art such as Ziegler catalysis with the addition of ethylene either during initiation, prior to termination or both. Preferrably conditions are chosen during the polymerization of the terminal block such that no polyethylene crystallinity is detectable in the final copolymer.

The copolymers of this invention are usually stabilized by the addition of various anti-oxidants such as tris(2-methyl-4-hydroxy-5-tert-butylphenol)butane, tetrakis(methylene(3,5-di-tert-butyl-4-hydroxyhydrocynnate))methane, or 1,3,5-trimethyl-2,4,6tris(3,5-di-tert-butyl-4-hydroxybenzyl)benzene. The preferred choice of antioxidant should be categorically a non-migratory stabilizer. This can usually be accomplished by choosing a relatively high molecular weight compound. Thus an anti-oxidant such as 2,6-di-tert-butyl-para-cresol, BHI, would not be preferred. The use of a non-migratory anti-oxidant is preferred since the print ink used in printing on polypropylene surfaces usually involves an oxidative curing step. Thus the presence of excess anti-oxidant on the print surface would tend to inhibit curing of the ink. Even such migratory anti-oxidants as BHT can be made operative provided that printing is done before it has an opportunity to bleed to the surface or provided that the surface is subjected to an oxidizing condition prior to printing, such as subjecting the surface to ionizing radiation (electric discharge) in the presence of air.

We have discovered that this particular class of polypropylene copolymers involving a terminal block of copolymerized ethylene and propylene exhibits excellent adhesion to a polypropylene mesh fabric when extruded upon the fabric in such a manner as to not significantly decrease the fabric's strength (greater than 80 per cent retention). In contrast to this it is our experience that other thermoplastics such as homopolymers of propylene and ethylene, and random or segmented block copolymers of ethylene and propylene do not display adequate adhesion under controlled extrusion onto polypropylene mesh fabric. Furthermore, the resulting print bands of this invention, unlike known commercial alternatives such as adhesively held polyethylene, are sufficiently flexible to allow the passage of sewing needles without breakage of the needles during manufacture of a bag.

The particular terminal block copolymers of this invention lend themselves to high speed extrusion of a print band onto the previously described open mesh fabrics. In one embodiment the polypropylene leno fabric is passed under the die orfice of a conventional extruder at a rate of 50 to 400 feet per minute, preferrably from 75 to 125, while a print band is being extruded through the die onto the fabric. The upper limit of the speed of extrusion is determined merely by the choice of size of the extruder. The width of mesh fabric being passed by the extruder die is not critical. For fruit and vegetable bag purposes the roll of mesh fabric is usually one to four feet wide. The width of the extruded print band can range from covering the entire fabric down to a fraction of an inch. For most applications a print band from two to twelve inches wide is sufficient. The thickness of the extruded label can range from ¾ ml to 5 ml and preferrably from 1 ½ mil to 2 ½ mil. It is critical that the surface of the fabric which is to receive the print band be free of any external lubricant, coating or adhesive. Preferably sufficient pigmentation is added to make the extruded print band opaque.

During the extrusion of the print band onto mesh fabric there are two conflicting considerations. One is that the extruded thermoplastic film must adhere to the fabric. Generally the adhesive properties increase with an increase in temperature and contact time at the increased temperature with the limit being an actual melting of the two substances. In conflict with this is the fact that increased temperatures and increased contact time tend to promote molecular relaxation of the fibers and decrease the fabric's strength. We have discovered that with simultaneous control of the time-temperature relationship of both the fabric and the extrudate good adhesion with retention of fabric strength can be achieved. This is accomplished by having the fabric in contact with a heat sink during the extrusion and then immediately cooling the extrudate.

The preferred method of operation is to have the fabric in contact with a metalic chill roll at the point where the extruded copolymer is applied and then have a second chill roll immediately come in contact with the print band side of the fabric. This can be accomplished by having two parallel chill rolls horizontally mounted and in contact with each other forming a nip. The mesh fabric is passed over the top of the first chill roll, down through the nip and under the other chill roll. The extrusion is performed vertically downward onto the fabric as it passes over the first chill roll. By this process the fabric is in contact with a thermally conductive surface during extrusion and the extrudate comes in contact with a similar surface after passing through the nip. Advantageously, the pair of chill rolls can exert sufficient pressure at the nip such that visually the yarns of the fabric can barely be seen through the print band when viewed from the print band side while these same yarns are clearly defined when viewed from the fabric side. Using this technique high production rates of mesh fabric having extruded print bands without loss of fabric strength are achieved.

Optionally, the print band surface can be treated by any known method to enhance the curing and adhesion of the ink such as subjecting the surface to an electrical discharge in the presence of air.

The following examples illustrate specific embodiments of our invention but should not be considered unduly limiting.

EXAMPLE 1

A 32-inch wide roll of polypropylene (homopolymer which had been pigmented bright red) leno fabric having 12 warp yarns per inch (six pairs) and 6 fill yarns per inch was coated with an aqueous dispersion of a copolymer of vinyl acetate and dibutyl maleate (Flexbond) by passing the fabric over a roller which kiss coated the entire fabric except for an 8 ½-inch wide strip placed midway in the roll and subsequently dried.

This roll of coated leno fabric was passed between a pair of chill rolls at a rate of 90 linear feet per minute.

The two chill rolls were placed such that their axes were parallel to each other and horizontal. They were in contact with each other thus forming a nip through which the leno fabric was threaded. The leno fabric went over the top of the first water cooled chill roll, down through the nip, and then under the second water cooled chill roll where it was subsequently rewound.

A conventional extruder with a 10-inch die was mounted such that the extrudate was directed vertically downward onto the leno fabric as it passed over the first chill roll and prior to passing through the nip. The height above the fabric was adjusted such that the "neck down" of the extruded film melt resulted in an 8 ½-inch polypropylene film being extruded directly onto the uncoated area of the fabric. Polypropylene copolymer containing a terminal block of copolymerized ethylene and propylene wherein the ethylene of the terminal block represents from 2.0 to 5.0 weight per cent of the total polypropylene copolymer and having a flow rate of 4.0 to 6.5 g/10 min and a minimum density of 0.865 (Amoco 6014 polypropylene) was extruded directly onto the leno fabric at a melt temperature of 560° F. For every eight parts by weight of polypropylene present there was added one part by weight of a white concentrate containing 50 percent by weight white pigment. The resulting print band was immediately cooled by passing between the chill rolls. The pressure between the chill rolls was adjusted such that visually the leno fabric yarn could just barely be seen through the white copolymer print band but did not actually penetrate through it. These same yarns were clearly visible from the fabric side.

This printable surface when passed through a Corona discharge treatment showed excellent print characteristics. The leno fabric displayed no loss of strength and the print band would not peel off.

EXAMPLE 2

A 32-inch wide roll of polypropylene leno fabric having 8 warp yarns per inch (four pairs) and 6 fill yarns per inch was kiss coated with Flexbond in a manner similar to Example 1. An 8 ½-inch wide strip of fabric was left uncoated midway in the roll. Amoco 6014 polypropylene copolymer was extruded directly onto the uncoated part of the fabric and the fabric was immediately passed between a pair of chill rolls in a manner described in Example 1. The melt temperature of the extruded copolymer was from 450° to 500° F while the rate of extruding the print band was 70 linear feet of fabric per minute. Again the leno fabric showed no loss of strength and the print band would not peel off.

EXAMPLE 3

The rolls of polypropylene leno fabric made in Examples 1 and 2 were cut and sewed into bags. No significant needle breakage or fabric snagging was experienced when sewing through the print band.

We claim:

1. A polyolefin fabric having integrally adhered to it, by extrusion without significant loss of fabric strength, a printable surface consisting of a polypropylene copolymer resin having a terminal block of copolymerized ethylene and propylene wherein the ethylene of said terminal block represents from 1.0 to 6.0 weight per cent of said propylene copolymer resin, a melt flow of 1.5 to 10.0 g/10 min, and a specific gravity of at least 0.865.

2. A fabric of claim 1 wherein the polyolefin is polypropylene.

3. A fabric of claim 2 wherein the fabric is a mesh fabric.

4. A bag made from the fabric of claim 3.

5. A fabric of claim 3 wherein the mesh fabric is a leno fabric.

6. A bag made from the fabric of claim 5.

7. A fabric of claim 5 wherein the ethylene of said terminal block represents from 2.0 to 5.0 weight percent of said propylene copolymer and the melt flow of said propylene copolymer is from 4.0 to 6.5 g/10 min.

8. A bag made from the fabric of claim 7.

9. A process for making a polyolefin mesh fabric having integrally adhered to it, without significant loss of fabric strength, a printable surface involving the steps of extruding a polypropylene copolymer resin having a terminal block of copolymerized ethylene and propylene wherein the ethylene of said terminal block represents from 1.0 to 6.0 weight per cent of said propylene copolymer resin, a melt flow of 3.0 to 10.0 g/10 min, and a specific gravity of at least 0.865 onto a polyolefin mesh fabric while simultaneously removing heat energy from said polyolefin mesh fabric, pressing said extruded polypropylene copolymer partially into said polyolefin mesh fabric and then cooling said extruded polypropylene copolymer.

10. A process of claim 9 wherein said polyolefin mesh fabric is a leno fabric woven from polypropylene and wherein said polypropylene leno fabric is coated with an adhesive prior to extrusion everywhere except where said printable surface is to be placed.

* * * * *